(12) United States Patent
Delfort et al.

(10) Patent No.: US 9,873,081 B2
(45) Date of Patent: Jan. 23, 2018

(54) ABSORBENT SOLUTION BASED ON BETA-HYDROXYLATED TERTIARY DIAMINES AND METHOD OF REMOVING ACID COMPOUNDS FROM A GASEOUS EFFLUENT

(71) Applicant: IFP Energies nouvelles, Rueil-Malmaison (FR)

(72) Inventors: Bruno Delfort, Paris (FR); Dominique Le Pennec, Orgerus (FR); Julien Grandjean, Lyons (FR); Thierry Huard, Saint Symphorien d'Ozon (FR); Aurelie Wender, Rueil-Malmaison (FR); Armelle Nigon, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/311,283

(22) PCT Filed: May 12, 2015

(86) PCT No.: PCT/EP2015/060517
§ 371 (c)(1),
(2) Date: Nov. 15, 2016

(87) PCT Pub. No.: WO2015/173263
PCT Pub. Date: Nov. 19, 2015

(65) Prior Publication Data
US 2017/0100694 A1    Apr. 13, 2017

(30) Foreign Application Priority Data

May 16, 2014    (FR) ..................... 14 54372

(51) Int. Cl.
*C07C 217/42*    (2006.01)
*C07C 217/04*    (2006.01)
(Continued)

(52) U.S. Cl.
CPC ..... *B01D 53/1493* (2013.01); *B01D 53/1425* (2013.01); *B01D 53/1468* (2013.01);
(Continued)

(58) Field of Classification Search
None
See application file for complete search history.

(56) References Cited

U.S. PATENT DOCUMENTS

| 3,867,454 A | * | 2/1975 | Diana | ................ | C07D 295/088 540/596 |
| 4,405,582 A | | 9/1983 | Stogryn et al. | | |

(Continued)

FOREIGN PATENT DOCUMENTS

| EP | 2 429 686 A1 | 3/2012 |
| FR | 2934172 A1 | 1/2010 |

(Continued)

OTHER PUBLICATIONS

International Search Report for PCT/EP2015/060517 dated Jul. 20, 2015; English translation submitted herewith (5 Pages).

*Primary Examiner* — Daniel Berns
(74) *Attorney, Agent, or Firm* — Fitch, Even, Tabin & Flannery, LLP

(57) ABSTRACT

An absorbent solution is provided for removing acid compounds contained in a gaseous effluent and a method of removing acid compounds contained in a gaseous effluent contacts the gaseous effluent with the absorbent solution. The absorbent solution includes at least one of the following two nitrogen compounds belonging to the family of tertiary diamines:

(Continued)

1-dimethylamino-3-(2-dimethylaminoethoxy)-2-propanol

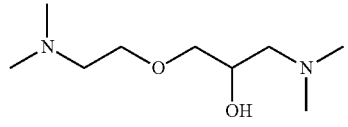

1,1'-oxybis[3-(dimethylamino)-2-propanol]

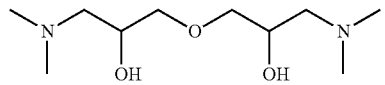

and water.

14 Claims, 4 Drawing Sheets

(51) Int. Cl.
*C07C 215/06* (2006.01)
*C07C 215/18* (2006.01)
*C10K 1/00* (2006.01)
*C10K 1/14* (2006.01)
*C10L 3/10* (2006.01)
*B01D 53/52* (2006.01)
*B01D 53/62* (2006.01)
*B01D 53/78* (2006.01)
*B01D 53/96* (2006.01)
*B01D 53/14* (2006.01)

(52) U.S. Cl.
CPC ........ *B01D 53/52* (2013.01); *B01D 2252/103* (2013.01); *B01D 2252/2041* (2013.01); *B01D 2252/20431* (2013.01); *B01D 2252/20484* (2013.01); *B01D 2252/20489* (2013.01); *B01D 2252/502* (2013.01); *B01D 2252/504* (2013.01)

(56) References Cited

U.S. PATENT DOCUMENTS

| 4,405,583 A | 9/1983 | Stogryn et al. |
| 6,852,144 B1 | 2/2005 | Wagner et al. |
| 2011/0185901 A1 | 8/2011 | Jacquin et al. |

FOREIGN PATENT DOCUMENTS

| FR | 2 961 114 A1 | 12/2011 |
| WO | 2011/082811 A1 | 7/2011 |

* cited by examiner

ABSORBENT SOLUTION BASED ON BETA-HYDROXYLATED TERTIARY DIAMINES AND METHOD OF REMOVING ACID COMPOUNDS FROM A GASEOUS EFFLUENT

CROSS-REFERENCE TO RELATED APPLICATIONS

This application is a U.S. national phase application filed under 35 U.S.C. § 371 of International Application No. PCT/EP2015/060517, filed May 12, 2015, designating the United States, which claims priority from French Patent Application No. 14/54.372, filed May 16, 2014, which are hereby incorporated herein by reference in their entirety for all purposes.

FIELD OF THE INVENTION

The present invention relates to the field of gaseous effluent deacidizing methods. The invention is advantageously applied for treating gas of industrial origin and natural gas.

BACKGROUND OF THE INVENTION

Gas deacidizing methods using aqueous amine solutions are commonly used for removing acid compounds present in a gas, notably carbon dioxide ($CO_2$), hydrogen sulfide ($H_2S$), carbon oxysulfide (COS), carbon disulfide ($CS_2$), sulfur dioxide ($SO_2$) and mercaptans (RSH) such as methylmercaptan ($CH_3SH$), ethylmercaptan ($CH_3CH_2SH$) and propylmercaptan ($CH_3CH_2CH_2SH$). The gas is deacidized by being contacted with the absorbent solution, then the absorbent solution is thermally regenerated.

These acid gas deacidizing methods are also commonly known as "solvent scrubbing", with a solvent referred to as "chemical", as opposed to the use of a solvent referred to as "physical" for absorption that is not based on chemical reactions.

A chemical solvent corresponds to an aqueous solution comprising a reactant that reacts selectively with the acid compounds ($H_2S$, $CO_2$, COS, $CS_2$, etc.) present in the treated gas so as to form salts, without reacting with the other non-acid compounds in the gas. After contacting with the solvent, the treated gas is depleted in acid compounds that are selectively transferred as salts into the solvent. The chemical reactions are reversible, which allows the acid compound-laden solvent to be subsequently deacidized, for example under the action of heat, so as to release on the one hand the acid compounds in form of gas that can then be stored, converted or used for various applications, and on the other hand to regenerate the solvent that goes back to its initial state and can thus be used again for a new reaction stage with the acid gas to be treated. The reaction stage of the solvent with the acid gas is commonly referred to as absorption stage, and the stage where the solvent is deacidized is referred to as solvent regeneration stage.

In general, the performances of the separation of acid compounds from the gas in this context mainly depend on the nature of the reversible reaction selected. Conventional acid gas deacidizing methods are generally referred to as "amine methods", i.e. based on the reactions of the acid compounds with amines in solution. These reactions are part of the overall framework of acid-base reactions. $H_2S$, $CO_2$ or COS are for example acid compounds, notably in the presence of water, whereas amines are basic compounds. The reaction mechanisms and the nature of the salts obtained generally depend on the structure of the amines used.

For example, document U.S. Pat. No. 6,852,144 describes a method of removing acid compounds from hydrocarbons using a water-N-methyldiethanolamine or water-triethanolamine absorbent solution with a high proportion of a compound belonging to the following group: piperazine and/or methylpiperazine and/or morpholine.

The performances of acid gas deacidizing methods using amine scrubbing directly depend on the nature of the amine(s) present in the solvent. These amines can be primary, secondary or tertiary. They can have one or more equivalent or different amine functions per molecule.

In order to improve the performances of deacidizing methods, increasingly efficient amines are continuously sought.

One limitation of the absorbent solutions commonly used in deacidizing applications is insufficient $H_2S$ absorption selectivity over $CO_2$. Indeed, in some natural gas deacidizing cases, selective $H_2S$ removal is sought by limiting to the maximum $CO_2$ absorption. This constraint is particularly important for gases to be treated already having a $CO_2$ content that is less than or equal to the desired specification. A maximum $H_2S$ absorption capacity is then sought with maximum $H_2S$ absorption selectivity over $CO_2$. This selectivity allows to maximize the amount of treated gas and to recover an acid gas at the regenerator outlet having the highest $H_2S$ concentration possible, which limits the size of the sulfur chain units downstream from the treatment and guarantees better operation. In some cases, an $H_2S$ enrichment unit is necessary for concentrating the acid gas in $H_2S$. In this case, the most selective amine is also sought. Tertiary amines such as N-methyldiethanolamine or hindered secondary amines exhibiting slow reaction kinetics with $CO_2$ are commonly used, but they have limited selectivities at high $H_2S$ loadings.

It is well known to the person skilled in the art that tertiary amines or secondary amines with severe steric hindrance have slower $CO_2$ capture kinetics than less hindered primary or secondary amines. On the other hand, tertiary or secondary amines with severe steric hindrance have instantaneous $H_2S$ capture kinetics, which allows to achieve selective $H_2S$ removal based on distinct kinetic performances.

Various documents propose using hindered tertiary or secondary amines, in particular hindered tertiary or secondary diamines in solution, for deacidizing acid gases.

Among the applications of tertiary or secondary amines with severe steric hindrance, U.S. Pat. No. 4,405,582 describes a method for selective absorption of sulfur-containing gases with an absorbent containing a diaminoether at least one amine function of which is tertiary and whose other amine function is tertiary or secondary with severe steric hindrance, the nitrogen atom being in the latter case linked to either at least one tertiary carbon or to two secondary carbon atoms. The two amine functions and the carbons of the main chain can be substituted by alkyl or hydroxyalkyl radicals.

U.S. Pat. No. 4,405,583 also describes a method for selective removal of $H_2S$ in gases containing $H_2S$ and $CO_2$ with an absorbent containing a diaminoether whose two secondary amine functions exhibit severe steric hindrance as defined above. The amine functions and the carbons of the main chain can be substituted by alkyl and hydroxyalkyl radicals.

Patent FR-2,934,172 describes the use of an absorbent solution based on a tertiary diamine in an acid compound removal method advantageously applied to the treatment of natural gas and combustion fumes, said amine being N,N,N',N'-tetramethyl-1,6-hexanediamine.

Another limitation of the absorbent solutions commonly used in total deacidizing applications is too slow $CO_2$ or COS capture kinetics. In cases where the desired $CO_2$ or COS specifications level is very high, the fastest possible reaction kinetics is sought so as to reduce the height of the absorption column. Indeed, this equipment under pressure represents a significant part of the investment costs of the process.

Whether seeking maximum $CO_2$ and COS capture kinetics in a total deacidizing application or minimum $CO_2$ capture kinetics in a selective application, it is always desirable to use an absorbent solution having the highest cyclic capacity possible. This cyclic capacity, denoted by $\Delta\alpha$, corresponds to the loading difference (a designates the number of moles of absorbed acid compounds $n_{acid\ gas}$ per kilogram of absorbent solution) between the absorbent solution discharged from the bottom of the absorption column and the absorbent solution fed to said column. Indeed, the higher the cyclic capacity of the absorbent solution, the lower the absorbent solution flow rate required for deacidizing the gas to be treated. In gas treatment methods, reduction of the absorbent solution flow rate also has a great impact on the reduction of investments, notably as regards absorption column sizing.

Another essential aspect of gas or industrial fumes treatment operations using a solvent remains the regeneration of the separation agent. Regeneration through expansion and/or distillation and/or entrainment by a vaporized gas referred to as "stripping gas" is generally considered depending on the absorption type (physical and/or chemical). The energy consumption required for solvent regeneration can be very high, which is in particular the case when the partial pressure of acid gases is low, and it can represent a considerable operating cost for the $CO_2$ capture process.

It is well known to the person skilled in the art that the energy required for regeneration by distillation of an amine solution can be divided into three different items: the energy required for heating the absorbent solution between the top and the bottom of the regenerator, the energy required for lowering the acid gas partial pressure in the regenerator by vaporization of a stripping gas, and the enthalpy required for breaking the chemical bond between the amine and the $CO_2$.

These first two items are proportional to the absorbent solution flows to be circulated in the plant in order to achieve a given specification. In order to decrease the energy consumption linked with the regeneration of the solvent, the cyclic capacity of the solvent is therefore once again preferably maximized. Indeed, the higher the cyclic capacity of the absorbent solution, the lower the absorbent solution flow rate required for deacidizing the gas to be treated.

There is therefore a need, in the field of gas deacidizing, for compounds that are good candidates for acid compounds removal from a gaseous effluent, notably, but not exclusively, selective removal of $H_2S$ over $CO_2$, and that allow operation at lower operating costs (including the regeneration energy) and investment costs (including the cost of the absorption column).

DESCRIPTION OF THE INVENTION

The inventors have found that tertiary or secondary diamines with severe steric hindrance are not equivalent in terms of performance for use in absorbent solution formulations for acid gas treatment in industrial processes.

The object of the present invention is the use, in the field of gas deacidizing, of particular tertiary diamines whose main chain, i.e. the chain linking the two tertiary amine functions, is a hydrocarbon chain comprising an ether function, of alkoxyalkyl type, said chain being substituted by a hydroxyl group carried by a carbon atom at beta position of at least one of the nitrogen atoms. The term beta-hydroxylated tertiary diamine is used in the present invention in reference to the position of a hydroxyl group with respect to an amine function as described.

The inventors have found that using beta-hydroxylated tertiary diamines meeting general formula (I) below allows to obtain good performances in terms of cyclic absorption capacity for acid gases and of $H_2S$ absorption selectivity, notably a higher absorption selectivity towards $H_2S$ than reference amines such as N-methyldiethanolamine (MDEA) for an equivalent or higher acid gas absorption cyclic capacity.

SUMMARY OF THE INVENTION

According to a first aspect, the invention relates to an absorbent solution for removing acid compounds contained in a gaseous effluent, comprising:
  water;
  at least one of the following two nitrogen compounds belonging to the family of tertiary diamines:
    1-dimethylamino-3-(2-dimethylaminoethoxy)-2-propanol of formula as follows:

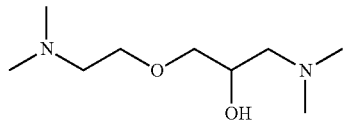

1,1'-oxybis[3-(dimethylamino)-2-propanol] of formula as follows:

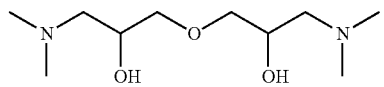

Preferably, the absorbent solution comprises between 5 wt. % and 95 wt. % of said nitrogen compound, preferably between 10 wt. % and 90 wt. % of said nitrogen compound, and between 5 wt. % and 95 wt. % of water, preferably between 10 wt. % and 90 wt. % of water.

Furthermore, the absorbent solution can comprise between 5 wt. % and 95 wt. % of at least one additional amine, said additional amine being either a tertiary amine or a secondary amine having two secondary carbons at nitrogen alpha position or at least one tertiary carbon at nitrogen alpha position.

Said additional amine can be a tertiary amine selected among the group made up of:
  N-methyldiethanolamine,
  triethanolamine,
  diethylmonoethanolamine,
  dimethylmonoethanolamine, and
  ethyldiethanolamine.

The absorbent solution can also comprise a non-zero amount less than 30 wt. % of at least one additional amine such as a primary amine or a secondary amine.

Said additional primary or secondary amine can be selected among the group made up of:
  monoethanolamine,
  diethanolamine,
  N-butylethanolamine,
  aminoethylethanolamine,
  diglycolamine,
  piperazine,
  1-methylpiperazine,
  2-methylpiperazine,
  homopiperazine, N-(2-hydroxyethyl) piperazine,
N-(2-aminoethyl)piperazine,
morpholine,
3-(methylamino)propylamine,
1,6-hexanediamine,
N,N-dimethyl-1,6-hexanediamine,
N,N'-dimethyl-1,6-hexanediamine,
N-methyl-1,6-hexane-diamine, and
N,N',N'-trimethyl-1,6-hexanediamine.

The absorbent solution can furthermore comprise at least one physical solvent selected from among the group made up of methanol, ethanol, 2-ethoxyethanol, triethylene glycoldimethylether, tetraethylene glycoldimethylether, pentaethylene glycoldimethylether, hexaethylene glycoldimethylether, heptaethylene glycol-dimethylether, octaethylene glycoldimethylether, diethylene glycol butoxyacetate, glycerol triacetate, sulfolane, N-methylpyrrolidone, N-methylmorpholin-3-one, N,N-dimethylformamide, N-formyl-morpholine, N,N-dimethyl-imidazolidin-2-one, N-methylimidazole, ethylene glycol, diethylene glycol, triethylene glycol, thiodiglycol and tributyl phosphate.

According to a second aspect, the invention relates to a method of removing acid compounds contained in a gaseous effluent wherein an acid compound absorption stage is carried out by contacting the gaseous effluent with an absorbent solution according to the invention.

Preferably, the acid compound absorption stage is carried out at a pressure ranging between 1 bar and 200 bar, and at a temperature ranging between 20° C. and 100° C.

Preferably, an acid compound-laden absorbent solution is obtained after the absorption stage and at least one stage of regenerating said acid compound-laden absorbent solution is carried out at a pressure ranging between 1 bar and 10 bar, and at a temperature ranging between 100° C. and 180° C.

The gaseous effluent can be selected from among natural gas, syngases, combustion fumes, refinery gas, acid gas from an amine plant, Claus tail gas, biomass fermentation gas, cement plant gas and incinerator fumes.

The method according to the invention can be implemented for selectively removing the $H_2S$ over the $CO_2$ from a gaseous effluent comprising $H_2S$ and $CO_2$, preferably natural gas.

BRIEF DESCRIPTION OF THE FIGURES

Other features and advantages of the invention will be clear from reading the description hereafter of embodiments given by way of non limitative example, with reference to the accompanying figure described hereafter.

Figure 1:
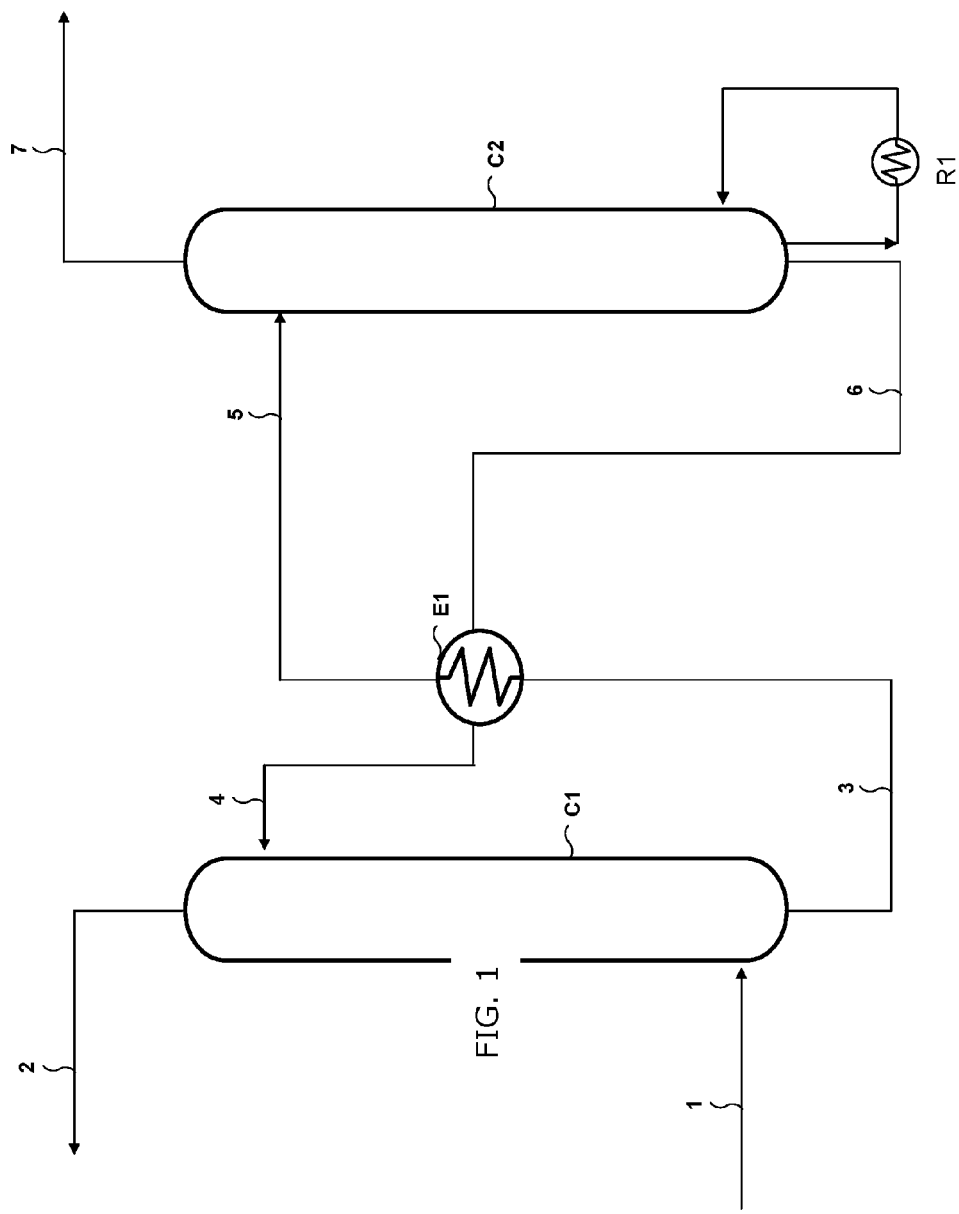
FIG. 1 is a block diagram of the implementation of an acid gas treating method.

In the diagrams of the present application illustrating the preparation of nitrogen compounds according to the invention, the arrows represent reaction stages. These are reaction schemes.

DETAILED DESCRIPTION OF THE INVENTION

The present invention aims to remove acid compounds from a gaseous effluent using an aqueous solution whose composition is detailed hereafter.

Composition of the Absorbent Solution

The absorbent solution used for removing the acid compounds contained in a gaseous effluent comprises:
water,
at least one nitrogen compound belonging to the family of tertiary diamines meeting formula (I) as follows:

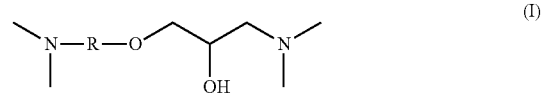

wherein:
R is selected from among one of the following two groups R1 and R2:

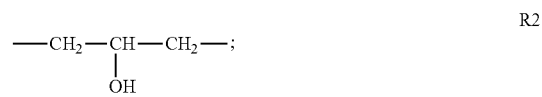

In general formula (I), the hydroxyl group(s) are carried by carbon atoms at amine beta position.

The absorbent solution can comprise 1-dimethylamino-3-(2-dimethylaminoethoxy)-2-propanol when R is equal to R1, or 1,1'-oxybis[3-(dimethylamino)-2-propanol] when R is equal to R2, or a mixture of the two compounds.

The formula of 1-dimethylamino-3-(2-dimethylaminoethoxy)-2-propanol is as follows:

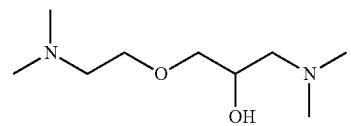

The formula of 1,1'-oxybis[3-(dimethylamino)-2-propanol] is as follows:

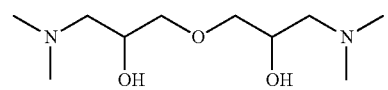

In the present description, a tertiary diamine is understood to be a chemical compound comprising two amine functions which are tertiary amine functions.

The amines of general formula (I) can be in variable concentration in the absorbent solution, ranging for example between 5 wt. % and 95 wt. %, preferably between 10 wt. % and 90 wt. %, more preferably between 20 wt. % and 60 wt. %, and most preferably between 25 wt. % and 50 wt. %, inclusive.

The absorbent solution can contain between 5 wt. % and 95 wt. % of water, preferably between 10 wt. % and 90 wt. %, more preferably between 40 wt. % and 80 wt. %, and most preferably between 50 wt. % and 75 wt. %, inclusive.

The sum of the mass fractions expressed in wt. % of the various compounds of the absorbent solution is 100 wt. % of the absorbent solution.

According to one embodiment, the absorbent solution can furthermore contain at least one additional amine that is a tertiary amine, such as N-methyldiethanolamine, triethanolamine, diethylmonoethanolamine, dimethylmonoethanolamine or ethyldiethanolamine, or a secondary amine with severe steric hindrance, this hindrance being defined by either the presence of two secondary carbons at nitrogen alpha position or at least one tertiary carbon at nitrogen alpha position. Said additional amine is understood to be any compound having at least one severely hindered tertiary or secondary amine function. The concentration of said severely hindered tertiary or secondary additional amine in the absorbent solution can range between 5 wt. % and 95 wt. %, preferably between 5 wt. % and 50 wt. %, more preferably between 5 wt. % and 30 wt. %.

According to an embodiment, the amines of general formula (I) can be formulated with one or more compounds containing at least one primary or secondary amine function. For example, the absorbent solution comprises up to a concentration of 30 wt. %, preferably below 15 wt. % and more preferably below 10 wt. % of said compound containing at least one primary or secondary amine function. Preferably, the absorbent solution comprises at least 0.5 wt. % of said compound containing at least one primary or secondary amine function. Said compound allows to accelerate the absorption kinetics of the $CO_2$ and, in some cases, of the COS contained in the gas to be treated.

A non-exhaustive list of compounds containing at least one primary or secondary amine function that can go into the formulation is given below:
monoethanolamine,
diethanolamine,
N-butylethanolamine,
aminoethylethanolamine,
diglycolamine,
piperazine,
1-methylpiperazine,
2-methylpiperazine,
homopiperazine,
N-(2-hydroxyethyl) piperazine,
N-(2-aminoethyl)piperazine,
morpholine,
3-(metylamino)propylamine,
1,6-hexanediamine and all the diversely N-alkylated derivatives thereof such as, for example, N,N-dimethyl-1,6-hexanediamine, N,N'-dimethyl-1,6-hexanediamine, N-methyl-1,6-hexanediamine or N,N',N'-trimethyl-1,6-hexane-diamine.

The absorbent solution comprising at least one compound according to the invention can contain a mixture of additional amines as defined above.

According to an embodiment, the absorbent solution can contain organic compounds non reactive towards the acid compounds (commonly referred to as "physical solvents"), which allow to increase the solubility of at least one or more acid compounds of the gaseous effluent. For example, the absorbent solution can comprise between 5 wt. % and 50 wt. % of physical solvent such as alcohols, ethers, ether alcohols, glycol and polyethylene glycol ethers, glycol thioethers, glycol and polyethylene glycol esters and alkoxyesters, glycerol esters, lactones, lactames, N-alkylated pyrrolidones, morpholine derivatives, morpholin-3-one, imidazoles and imidazolidinones, N-alkylated piperidones, cyclotetramethylenesulfones, N-alkylformamides, N-alkylacetamides, ether-ketones, alkyl carbonates or alkyl phosphates and derivatives thereof.

By way of non limitative example, it can be methanol, ethanol, 2-ethoxyethanol, triethylene glycoldimethylether, tetraethylene glycoldimethylether, pentaethylene glycol-dimethylether, hexaethylene glycoldimethylether, heptaethylene glycol-dimethylether, octaethylene glycoldimethylether, diethylene glycol butoxyacetate, glycerol triacetate, sulfolane, N-methylpyrrolidone, N-methylmorpholin-3-one, N,N-dimethylformamide, N-formyl-morpholine, N,N-dimethyl-imidazolidin-2-one, N-methylimidazole, ethylene glycol, diethylene glycol, triethylene glycol, thiodiglycol, propylene carbonate, tributylphosphate.

Figure 2:
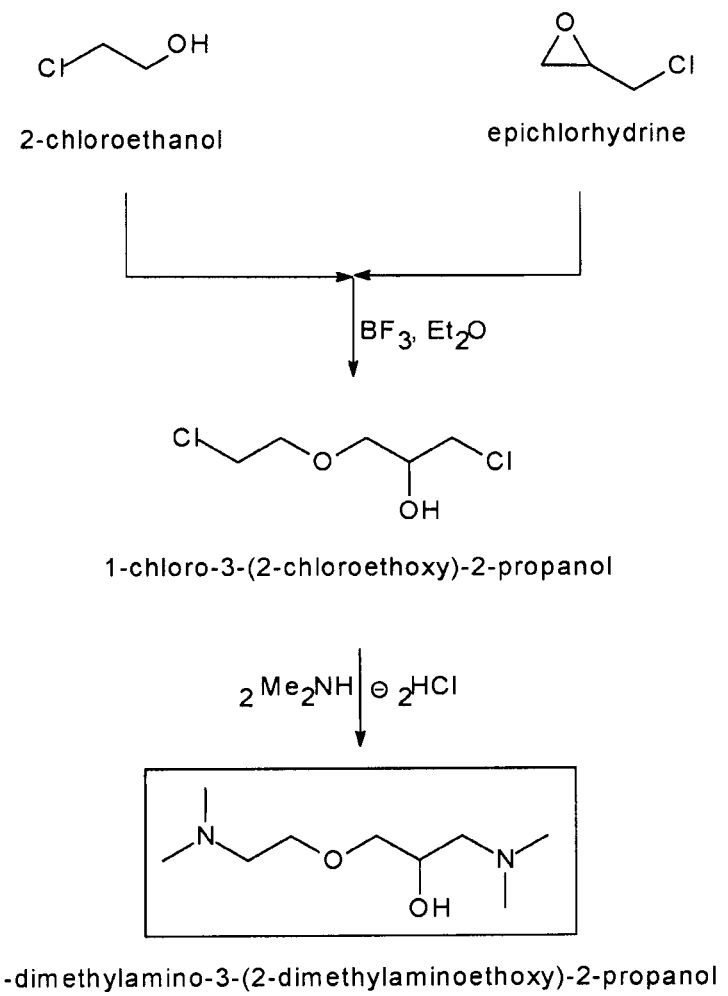
FIG. 2 shows the synthesis of 1-dimethylamino-3-(2-dimethylaminoethoxy)-2-Propanol according to a first route (A).

Synthesis of the Compounds of General Formula (I) of the Absorbent Solution According to the Invention Synthesis of 1-dimethylamino-3-(2-dimethylaminoethoxy)-2-propanol Route A:
the synthesis of 1-dimethylamino-3-(2-dimethylaminoethoxy)-2-propanol can be achieved according to a first route (A) as illustrated in FIG. 2.
A reaction of addition of one molecule of 2-haloethanol, in particular 2-chloroethanol, to one molecule of epihalohydrine, more particularly epichlorhydrine, is first conducted to form a 1-halo-3-(2-haloethoxy)-2-propanol, more generally 1-chloro-3-(2-chloroethoxy)-2-propanol. The monoadduct selectivity of this reaction is promoted by operating with excess 2-chloroethanol. This reaction can be catalyzed for example by a Lewis acid such as boron trifluoride, which can be associated with diethyl ether.

Secondly, a reaction of substitution of one molecule of 1-chloro-3-(2-chloroethoxy)-2-propanol with 2 molecules of dimethylamine yields 1-dimethylamino-3-(2-dimethylaminoethoxy)-2-propanol. This reaction is preferably conducted with excess dimethylamine. The hydrochloric acid formed upon condensation can be neutralized in situ by means of a base present during the reaction or after completion thereof.

The first addition reaction and the second substitution reaction are conducted in two successive stages.

Figure 3:
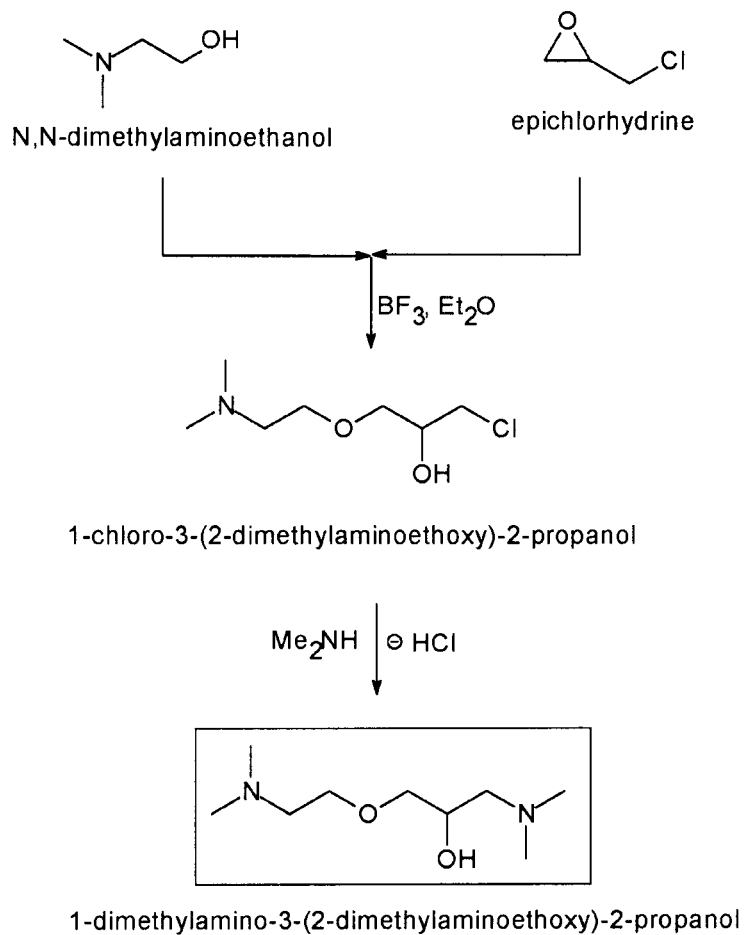
FIG. 3 shows the synthesis of 1-dimethylamino-3-(2-dimethylaminoethoxy)-2-propanol according to a second route (B).

Route B:
the synthesis of 1-dimethylamino-3-(2-dimethylaminoethoxy)-2-propanol can be achieved according to a second route (B) as illustrated in FIG. 3.

According to this second route B, a reaction of addition of one molecule of 2-dimethylaminoethanol to one molecule of epihalodryne, in particular epichlorhydrine, is first conducted to form a 1halo-3-(2-dimethylaminoethoxy)-2-propanol, more particularly 1-chloro-3-(2-dimethylaminoethoxy)-2-propanol. The monoadduct selectivity of this reaction is promoted by operating with excess 2-dimethylaminoethanol. This reaction can be catalyzed for example by a Lewis acid such as boron trifluoride, which can be associated with diethyl ether.

Secondly, a reaction of substitution of one molecule of 1-chloro-3-(2-dimethylaminoethoxy)-2-propanol with one molecule of dimethylamine yields 1-dimethylamino-3-(2-dimethylaminoethoxy)-2-propanol. This reaction is preferably conducted with excess dimethylamine. The hydrochloric acid formed upon condensation can be neutralized in situ by means of a base present during the reaction or after completion thereof.

The first addition reaction and the second substitution reaction are conducted in two successive stages.

Synthesis of 1,1'-oxybis[3-(dimethylamino)-2-propanol]

Figure 4:
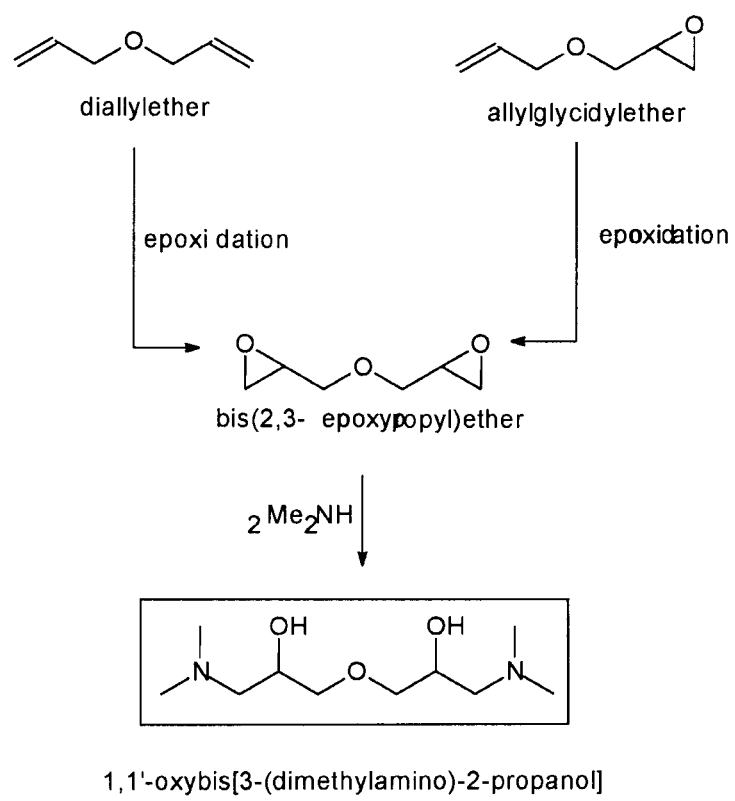
FIG. 4 shows the synthesis of 1,1'-oxybis[3-(dimethylamino)-2-propanol].

The synthesis of 1,1'-oxybis[3-(dimethylamino)-2-propanol] is illustrated in FIG. 4.
Either a reaction of epoxidation of each one of the two alkene functions of the diallyl ether to oxirane functions in order to obtain bis(2,3-epoxypropyl)ether, or a reaction of epoxidation of the alkene function of the allylglycid ether to an oxirane function in order to obtain bis(2,3-epoxypropyl) ether is first conducted.

This epoxidation reaction can be carried out with any means known to the person skilled in the art for conducting epoxidation of a carbon-carbon double bond. A peroxide, a hydroperoxide, a peracid such as peracetic acid or 3-chloroperbenzoic acid, or a perester can be used for example. It is also possible to use the combination of an acid such as acetic acid and of a peroxide such as hydrogen peroxide allowing in-situ generation of a peracid. The reaction can be conducted under mild conditions, for example at a temperature close to ambient temperature, and in the presence of a solvent, which can be a chlorinated solvent such as dichloromethane or an aliphatic or aromatic hydrocarbon solvent. The epoxidation reaction of an unsaturation can also be performed by means of oxygen and of a suitable catalytic system.

Secondly, the reaction of addition of two molecules of dimethylamine to one molecule of bis(2,3-epoxypropyl) ether to form the 1,1'-oxybis[3-(dimethylamino)-2-propanol] is carried out. This reaction can be carried out with excess dimethylamine. It is an exothermic reaction that is preferably performed with suitable temperature control. For example, the temperature is maintained within the −15° C./100° C. range.

Preferably, the first epoxidation reaction and the second addition reaction are conducted in two successive stages.

Nature of the Gaseous Effluents

The absorbent solutions according to the invention can be used for deacidizing the following gaseous effluents: natural gas, syngas, combustion fumes, refinery gas, acid gas from an amine plant, Claus tail gas, biomass fermentation gas, cement plant gas and incinerator fumes. These gaseous effluents contain one or more of the following acid compounds: $CO_2$, $H_2S$, mercaptans (for example methylmercaptan ($CH_3SH$), ethylmercaptan ($CH_3CH_2SH$), propylmercaptan ($CH_3CH_2CH_2SH$)), COS, $CS_2$, $SO_2$.

Combustion fumes are produced notably by the combustion of hydrocarbons, biogas, coal in a boiler or for a combustion gas turbine, for example in order to produce electricity. By way of illustration, a deacidizing method according to the invention can be implemented for absorbing at least 70%, preferably at least 80% or even at least 90% of the $CO_2$ contained in combustion fumes. These fumes generally have a temperature ranging between 20° C. and 60° C., a pressure ranging between 1 and 5 bar, and they can comprise between 50 and 80% nitrogen, between 5 and 40% carbon dioxide, between 1 and 20% oxygen, and some impurities such as SOx and NOx if they have not been removed upstream from the deacidizing process. In particular, the deacidizing method according to the invention is particularly well suited for absorbing the $CO_2$ contained in combustion fumes having a low $CO_2$ partial pressure, for example a $CO_2$ partial pressure below 200 mbar.

The deacidizing method according to the invention can be implemented for deacidizing a syngas. Syngas contains carbon monoxide CO, hydrogen $H_2$ (generally with a $H_2$/CO ratio of 2), water vapour (generally at saturation at the wash temperature) and carbon dioxide $CO_2$ (of the order of 10%). The pressure generally ranges between 20 and 30 bar, but if can reach up to 70 bar. It can also comprise sulfur-containing ($H_2S$, COS, etc.), nitrogen-containing ($NH_3$, HCN) and halogenated impurities.

The deacidizing method according to the invention can be implemented for deacidizing a natural gas. Natural gas predominantly consists of gaseous hydrocarbons, but it can contain some of the following acid compounds: $CO_2$, $H_2S$, mercaptans, COS, $CS_2$. The proportion of these acid compounds is very variable and it can reach up to 70 vol. % for $CO_2$ and up to 40 vol. % for $H_2S$. The temperature of the natural gas can range between 20° C. and 100° C. The pressure of the natural gas to be treated can range between 10 and 200 bar. The invention can be implemented in order to reach specifications generally imposed on deacidized gas, which are less than 2% $CO_2$, or even less than 50 vol.ppm $CO_2$ so as to subsequently carry out liquefaction of the natural gas, less than 4 vol.ppm $H_2S$, and less than 50 vol.ppm or even less than 10 vol.ppm total sulfur.

Method of Removing Acid Compounds from a Gaseous Effluent

Using an aqueous solution comprising a compound according to general formula (I) for deacidizing a gaseous effluent is schematically done by carrying out an absorption stage followed by a regeneration stage, as shown in FIG. 1 for example.

With reference to FIG. 1, the plant for deacidizing a gaseous effluent according to the invention comprises an absorption column C1 provided with means for contacting the gas and the liquid, for example a random packing, a structured packing or trays. The gaseous effluent to be treated is fed through a line 1 opening into the bottom of column C1. A line 4 allows the absorbent solution to be fed to the top of column C1. A line 2 allows the treated (deacidized) gas to be discharged and a line 3 allows the absorbent solution enriched in acid compounds following absorption to be sent to a regeneration column C2. This regeneration column C2 is provided with gas-liquid contacting internals, for example trays, random or structured packings. The bottom of column C2 is equipped with a reboiler R1 that provides the heat required for regeneration by vaporizing a fraction of the absorbent solution. The acid compound-enriched solution is fed to the top of regeneration column C2 through a line 5. A line 7 allows to discharge at the top of column C2 the gas enriched in acid compounds released upon regeneration, and a line 6 arranged in the bottom of column C2 allows the regenerated absorbent solution to be sent to absorption column C1. A heat exchanger E1 allows the heat of the regenerated absorbent solution from column C2 to be recovered so as to heat the acid compound-enriched absorbent solution leaving absorption column C1.

The absorption stage consists in contacting the gaseous effluent delivered through line 1 with the absorbent solution delivered through line 4. Upon contact, the amine functions of the molecules according to general formula (I) of the absorbent solution react with the acid compounds contained in the effluent so as to obtain an acid compound-depleted gaseous effluent that is discharged through line 2 at the top of column C1 and an acid compound-enriched absorbent solution that is discharged through line 3 in the bottom of column C1 to be regenerated.

The acid compound absorption stage can be carried out at a pressure in column C1 ranging between 1 and 200 bar, preferably between 20 and 100 bar for natural gas treatment, preferably between 1 and 3 bar for industrial fumes treatment, and at a temperature in column C1 ranging between 20° C. and 100° C., preferably between 30° C. and 90° C., or even between 30° C. and 60° C.

The regeneration stage notably consists in heating and optionally in expanding the acid compound-enriched absorbent solution so as to release the acid compounds in gas form. The acid compound-enriched absorbent solution leaving column C1 is fed to heat exchanger E1 where it is heated by the stream circulating in line 6 and coming from regeneration column C2. The heated solution at the outlet of E1 is fed to regeneration column C2 through line 5.

In regeneration column C2, under the effect of contacting the absorbent solution flowing in through line 5 with the vapour produced by the reboiler, the acid compounds are released in gas form and discharged at the top of column C2 through line 7. The regenerated absorbent solution, i.e. depleted in acid compounds, is discharged through line 6 and cooled in E1, then recycled to absorption column C1 through line 4.

The regeneration stage can be carried out by thermal regeneration, optionally complemented by one or more expansion stages. For example, the acid compound-enriched absorbent solution discharged through line 3 can be sent to a first flash drum (not shown) prior to being sent to heat exchanger E1. In the case of a natural gas, expansion allows to obtain a gas discharged at the top of the drum that contains the major part of the aliphatic hydrocarbons co-absorbed by the absorbent solution. This gas can be optionally washed by a fraction of the regenerated absorbent solution and the gas thus obtained can be used as fuel gas. The flash drum preferably operates at a pressure lower than in absorption column C1 and higher than in regeneration column C2. This pressure is generally determined by the conditions of use of the fuel gas, and it is typically of the order of 5 to 15 bar. The flash drum operates at a temperature substantially identical to the temperature of the absorbent solution obtained in the bottom of absorption column C1.

Regeneration can be carried out at a pressure in column C2 ranging between 1 and 5 bar, or even up to 10 bar, and at a temperature in column C2 ranging between 100° C. and 180° C., preferably between 110° C. and 170° C., more preferably between 120° C. and 140° C. Preferably, the regeneration temperature in column C2 ranges between 155° C. and 180° C. in cases where the acid gases are intended to be reinjected. Preferably, the regeneration temperature in column C2 ranges between 115° C. and 130° C. in cases where the acid gas is sent to the atmosphere or to a downstream treating process such as a Claus process or a tail gas treating process.

EXAMPLES

The examples below illustrate by way of non limitative example the synthesis of the compounds according to general formula (I), and some performances of these compounds when used in aqueous solution for removing acid compounds such as $CO_2$ or $H_2S$ contained in a gaseous effluent by contacting the gaseous effluent with the solution.

Example 1: Synthesis of the Molecules According to the Invention

The examples hereafter describe the synthesis of 1-dimethylamino-3-(2-dimethylaminoethoxy)-2-propanol and of 1,1'-oxybis[3-(dimethylamino)-2-propanol], it being understood that all the possibilities relative to the possible operating modes are not described here.

Synthesis of 1-dimethylamino-3-[2-dimethylaminoethoxy]-2-propanol (According to Route A)

277.3 g (3.44 mole) of 2-chloroethanol, then 1.2 g of boron trifluoride in diethyl etherate form are fed into a reactor, then, at a temperature maintained at 60° C., 107 g (1.15 mole) of epichlorhydrine is fed in four hours. After adding a solution of 1.4 g soda in 5 ml water, the excess 2-chloroethanol is evaporated and, after distillation under reduced pressure, 153.5 g of a product whose $^{13}C$ NMR spectrum ($CDCl_3$) characterized by the below data matches that of 1-chloro-3-(2-chloroethoxy)-2-propanol is isolated:
45.7 ppm: Cl—$CH_2$—$CH_2$—O—$CH_2$—CH(OH)—$CH_2$—Cl
71.5 ppm: Cl—$CH_2$—$CH_2$—O—$CH_2$—CH(OH)—$CH_2$—Cl
71.0 ppm: Cl—$CH_2$—$CH_2$—O—$CH_2$—CH(OH)—$CH_2$—Cl
69.7 ppm: Cl—$CH_2$—$CH_2$—O—$CH_2$—CH(OH)—$CH_2$—Cl
42.7 ppm: Cl—$CH_2$—$CH_2$—O—$CH_2$—CH(OH)—$CH_2$—Cl.

In an autoclave reactor, a mixture of 184.0 g (1.06 mole) of 1-chloro-3-(2-chloroethoxy)-2-propanol and of 715 g of an aqueous 40% dimethylamine solution is brought to 70° C. for seven hours. After return to ambient temperature, 85.0 g soda is introduced and the medium is maintained for 30 minutes under stirring, removal of the volatile fractions is then performed, followed by distillation under reduced pressure in order to isolate 148.6 g of a product whose $^{13}C$ NMR spectrum ($CDCl_3$) characterized by the below data matches that of 1-dimethylamino-3-(2-dimethylaminoethoxy)-2-propanol.
44.9 ppm: $(CH_3)_2$N—$CH_2$—$CH_2$—O—$CH_2$—CH(OH)—$CH_2$—N$(CH_3)_2$
58.0 ppm: $(CH_3)_2$N—$CH_2$—$CH_2$—O—$CH_2$—CH(OH)—$CH_2$—N$(CH_3)_2$
73.6 ppm: $(CH_3)_2$N—$CH_2$—$CH_2$—O—$CH_2$—CH(OH)—$CH_2$—N$(CH_3)_2$
68.4 ppm: $(CH_3)_2$N—$CH_2$—$CH_2$—O—$CH_2$—CH(OH)—$CH_2$—N$(CH_3)_2$
66.7 ppm: $(CH_3)_2$N—$CH_2$—$CH_2$—O—$CH_2$—CH(OH)—$CH_2$—N$(CH_3)_2$
61.9 ppm: $(CH_3)_2$N—$CH_2$—$CH_2$—O—$CH_2$—CH(OH)—$CH_2$—N$(CH_3)_2$
45.2 ppm: $(CH_3)_2$N—$CH_2$—$CH_2$—O—$CH_2$—CH(OH)—$CH_2$—N$(CH_3)_2$ Synthesis of 1,1'-oxybis[3-(dimethylamino)-2-propanol]

154.0 g (0.89 mole) of 3-chloroperbenzoic acid is added in four hours, in small fractions, to a solution of 69.7 g (0.61 mole) of allyl glycid ether in 1200 ml dichloromethane maintained between 0° C. and 5° C. After return to ambient temperature, filtration of the medium is performed. The filtrate is washed with 350 ml of an aqueous sodium sulfite and soda solution, then twice with 250 ml water. After distillation, 57.0 g of a product whose $^{13}C$ NMR spectrum ($CDCl_3$) characterized by the below data matches that of bis(2,3-epoxypropyl)ether is obtained.
43.9 ppm: [$CH_2$(O)CH]—$CH_2$—O—$CH_2$—[CH(O)$CH_2$]
49.8 ppm: [$CH_2$(O)CH]—$CH_2$—O—$CH_2$—[CH(O)$CH_2$]
71.5 ppm: [$CH_2$(O)CH]—$CH_2$—O—$CH_2$—[CH(O)$CH_2$]
71.3 ppm: [$CH_2$(O)CH]—$CH_2$—O—$CH_2$—[CH(O)$CH_2$]
49.9 ppm: [$CH_2$(O)CH]—$CH_2$—O—$CH_2$—[CH(O)$CH_2$]
42.9 ppm: [$CH_2$(O)CH]—$CH_2$—O—$CH_2$—[CH(O)$CH_2$].

The previous synthesis is repeated so as to obtain an additional amount of bis(2,3-epoxypropyl)ether. 105.0 g (0.8 mole) of bis(2,3-epoxypropyl)ether is then added to 884 g of an aqueous 40% dimethylamine solution in two hours while maintaining the temperature at 5° C. After return to ambient temperature, the excess dimethylamine and the water are removed. After distillation under reduced pressure, 144.0 g of a product whose $^{13}C$ NMR spectrum ($CDCl_3$) characterized by the below data matches that of 1,1'-oxybis[3-(dimethylamino)-2-propanol] is isolated.
45.2 ppm: $(CH_3)_2$N—$CH_2$—CH(OH)—$CH_2$—O—$CH_2$—CH(OH)—$CH_2$—N$(CH_3)_2$
61.8 ppm: $(CH_3)_2$N—$CH_2$—CH(OH)—$CH_2$—O—$CH_2$—CH(OH)—$CH_2$—N$(CH_3)_2$
66.7 ppm: $(CH_3)_2$N—$CH_2$—CH(OH)—$CH_2$—O—$CH_2$—CH(OH)—$CH_2$—N$(CH_3)_2$
73.7 ppm: $(CH_3)_2$N—$CH_2$—CH(OH)—$CH_2$—O—$CH_2$—CH(OH)—$CH_2$—N$(CH_3)_2$ 73.7 ppm: $(CH_3)_2N-CH_2-CH(OH)-CH_2-O-CH_2-CH(OH)-CH_2-N(CH_3)_2$ 66.7 ppm: $(CH_3)_2N-CH_2-CH(OH)-CH_2-O-CH_2-CH(OH)-CH_2-N(CH_3)_2$ 61.8 ppm: $(CH_3)_2N-CH_2-CH(OH)-CH_2-O-CH_2-CH(OH)-CH_2-N(CH_3)_2$ 45.2 ppm: $(CH_3)_2N-CH_2-CH(OH)-CH_2-O-CH_2-CH(OH)-CH_2-N(CH_3)_2$

Example 2: $CO_2$ Absorption Rate of an Amine Formulation for a Selective Absorption Method Comparative $CO_2$ absorption tests are carried out with different absorbent solutions:

- an absorbent solution according to the invention comprising 47 wt. % 1-dimethylamino-3-(2-dimethylaminoethoxy)-2-propanol in water,
- an absorbent solution according to the invention comprising 48 wt. % 1,1'-oxybis[3-(dimethylamino)-2-propanol] in water,
- an aqueous solution of N-methyldiethanolamine (MDEA) with 47 wt. % MDEA, which is the reference absorbent solution for selective removal in gas treatment,
- an aqueous solution of 1,2-bis-(pyrrolidinylethoxy)-ethane with 50 wt. % 1,2-bis-(pyrrolidinylethoxy)-ethane, which is a diaminoether with two tertiary amine functions according to the general formula of U.S. Pat. No. 4,405,582 but has no alcohol function and does not fall within general formula (I) according to the invention,
- an aqueous solution of 1,2-bis-(tertiobutylaminoethoxy)-ethane with 40 wt. % 1,2-bis-(tertiobutylaminoethoxy)-ethane, which is a diaminoether with two secondary functions having severe steric hindrance of the nitrogen atoms according to the general formula of U.S. Pat. No. 4,405,583, with no alcohol function and which does not fall within general formula (I) according to the invention,
- an aqueous solution of N,N,N',N'-tetramethyl-1,6-hexanediamine (TMHDA) with 50 wt. % TMHDA, which is a tertiary diamine disclosed in patent FR-2,934,172, but which has no alcohol function and does not fall within general formula (I) according to the invention.

For each test, the $CO_2$ flow absorbed by the aqueous absorbent solution is measured in a closed reactor of Lewis cell type. 200 g solution is fed into the closed reactor at a controlled temperature of 50° C. Four successive $CO_2$ injections are carried out from 100 to 200 mbar in the vapour phase of the 200 cm$^3$-volume reactor. The gas phase and the liquid phase are stirred at 100 rpm and entirely characterized from the hydrodynamic point of view. For each injection, the $CO_2$ absorption rate is measured through pressure variation in the gas phase. A global transfer coefficient Kg is thus determined using a mean of the results obtained for the four injections.

The results obtained are shown in Table 1 hereafter in relative absorption rate by comparison with the reference aqueous absorbent solution comprising 47 wt. % MDEA, this relative absorption rate being defined by the ratio of the global transfer coefficient of the absorbent solution tested to the global transfer coefficient of the reference absorbent solution (with MDEA).

TABLE 1

| Compound | Concentration (wt. %) | $CO_2$ relative absorption rate at 50° C. |
|---|---|---|
| MDEA | 47 | 1.00 |
| 1,2-bis-(pyrrolidinylethoxy)-ethane (according to patent U.S. Pat. No. 4,405,582) | 50 | 1.43 |
| 1,2-bis-(tertiobutylaminoethoxy)-ethane (according to patent U.S. Pat. No. 4,405,583) | 40 | 1.74 |
| TMHDA (according to FR2934172) | 50 | 2.72 |
| 1-dimethylamino-3-(2-dimethylaminoethoxy)-2-propanol | 47 | 0.98 |
| 1,1'-oxybis[3-(dimethylamino)-2-propanol] | 48 | 0.74 |

The results show, under these test conditions, a slower rate of absorption of $CO_2$ by the absorbent solutions according to the invention compared to the reference formulation with MDEA and compared to the absorbent solutions with some molecules of the prior art. It therefore appears that the compounds according to the invention surprisingly are of particular and improved interest in the case of selective deacidizing of a gaseous effluent where the $CO_2$ absorption kinetics is to be limited.

Example 3: $H_2S$ Absorption Capacity of an Amine Formulation for a Selective Absorption Method The $H_2S$ absorption capacity performances at 40° C. of an aqueous solution of 1-dimethylamino-3-(2-dimethylaminoethoxy)-2-propanol according to the invention, containing 47 wt. % 1-dimethylamino-3-(2-dimethylaminoethoxy)-2-propanol, are compared with those of an MDEA aqueous solution containing 50 wt. % MDEA, which is a reference absorbent solution for selective removal in gas treatment.

An absorption test is carried out at 40° C. on aqueous amine solutions in a thermostat-controlled equilibrium cell. This test consists in injecting into the equilibrium cell, previously filled with degassed aqueous amine solution, a known amount of acid gas, $H_2S$ in this example, then in waiting for the equilibrium state to be reached. The amounts of acid gas absorbed in the aqueous amine solution are then deduced from the temperature and pressure measurements by means of material and volume balances. The solubilities are conventionally represented in form of $H_2S$ partial pressures (in bar) as a function of the $H_2S$ loading (in mol of $H_2S$/kg absorbent solution and in mol of $H_2S$/mol of amine).

In the case of selective deacidizing in natural gas treatment, the $H_2S$ partial pressures encountered in acid gases typically range between 0.05 and 0.15 bar at a temperature of 40° C. By way of example, in this industrial range, Table 2 below compares the $H_2S$ loadings obtained at 40° C. for various $H_2S$ partial pressures between the 50 wt. % MDEA absorbent solution and the 47 wt. % bis-(3-dimethylaminopropoxy)-1,2-ethane absorbent solution.

TABLE 2

| | 47 wt. % 1-dimethylamino-3-(2-dimethylaminoethoxy)-2-propanol aqueous solution at 40° C. | | 50 wt. % MDEA aqueous solution at 40° C. | |
|---|---|---|---|---|
| $H_2S$ partial pressure (bar) | $H_2S$ loading (mol/mol amine) | $H_2S$ loading (mol/kg) | $H_2S$ loading (mol/mol amine) | $H_2S$ loading (mol/kg) |
| 0.05 | 0.36 | 0.89 | 0.15 | 0.64 |
| 0.10 | 0.62 | 1.55 | 0.21 | 0.88 |
| 0.15 | 0.79 | 1.97 | 0.26 | 1.07 |

At 40° C., whatever the $H_2S$ partial pressure, the absorption capacity of the 1-dimethylamino-3-(2-dimethylaminoethoxy)-2-propanol aqueous solution according to the invention is higher than that of the MDEA solution. Indeed, at a 0.05 bar partial pressure, the $H_2S$ loading is 0.89 mol/kg in the 1-dimethylamino-3-(2-dimethyl-aminoethoxy)-2-propanol absorbent solution and 0.64 mol/kg in the reference MDEA absorbent solution. At a $H_2S$ partial pressure of 0.10 bar, the difference between the $H_2S$ loadings of the two absorbent solutions is 0.67 mol/kg with an absorption capacity for the 1-dimethylamino-3-(2-dimethyl-aminoethoxy)-2-propanol absorbent solution increased by 76% in relation to the reference MDEA absorbent solution. At a $H_2S$ partial pressure of 0.15 bar, the difference between the $H_2S$ loadings of the two absorbent solutions reaches 84% in favour of the 1-dimethylamino-3-(2-dimethyl-aminoethoxy)-2-propanol absorbent solution. It can thus be observed that the 47 wt. % 1-dimethylamino-3-(2-dimethyl-aminoethoxy)-2-propanol aqueous solution has a higher $H_2S$ absorption capacity than the reference 50 wt. % MDEA aqueous solution at 40° C., in the $H_2S$ partial pressure range between 0.05 and 0.15 bar corresponding to a partial pressure range representative of usual industrial conditions.

$CO_2$ absorption being slower in an aqueous solution of 1-dimethylamino-3-(2-dimethyl-aminoethoxy)-2-propanol than in a MDEA aqueous solution (see Example 2 above) and the acid gas, notably $H_2S$, absorption capacity being equivalent or higher with the 1-dimethylamino-3-(2-dimethyl-aminoethoxy)-2-propanol absorbent solution in relation to a MDEA aqueous solution as illustrated in the present example, it appears that this exemplified molecule according to the invention allows to reduce the absorbent solution flow rates required in selective deacidizing applications ($H_2S/CO_2$) for absorbing a given flow of $H_2S$ while reducing the flow of co-absorbed $CO_2$ in relation to the reference MDEA absorbent solution.

Example 4: $CO_2$ Absorption Capacity of Amine Formulations for an Acid Gas Treating Method The $CO_2$ absorption capacity performances at 80° C. of an aqueous solution of 1-dimethylamino-3-(2-dimethylaminoethoxy)-2-propanol according to the invention, containing 47 wt. % 1-dimethylamino-3-(2-dimethylaminoethoxy)-2-propanol, and of an aqueous solution of 1,1'-oxybis[3-(dimethylamino)-2-propanol] containing 50 wt. % 1,1'-oxybis[3-(dimethylamino)-2-propanol] are compared with those of an MDEA aqueous solution containing 47 wt. % MDEA, which is a reference absorbent solution for deacidizing $CO_2$-containing gas.

An absorption test is carried out at 80° C. according to the operating mode described in the previous example, the acid gas being here $CO_2$ instead of $H_2S$.

In the case of natural gas treatment deacidizing, the $CO_2$ partial pressures encountered in acid gases typically range between 1 and 3 bar, the gases being introduced at the bottom of an absorption column where the solution can reach a temperature of 80° C. By way of example, in this industrial range, Table 3 hereafter compares the $CO_2$ loadings obtained at 80° C. for various $CO_2$ partial pressures between the 47 wt. % MDEA absorbent solution and the 47 wt. % 1-dimethylamino-3-(2-dimethylaminoethoxy)-2-propanol and 50 wt. % 1,1'-oxybis[3-(dimethylamino)-2-propanol] absorbent solutions.

TABLE 3

| | Loading at 80° C. (mol $CO_2$/kg solvent) | |
|---|---|---|
| | $P_{PCO2}$ = 1 bar | $P_{PCO2}$ = 3 bar |
| 47 wt. % MDEA aqueous solution | 0.83 | 1.73 |
| 47 wt. % 1-dimethylamino-3-(2-dimethylaminoethoxy)-2-propanol aqueous solution | 1.06 | 2.37 |
| 50 wt. % 1,1'-oxybis[3-(dimethylamino)-2-propanol] aqueous solution | 1.00 | 2.21 |

At 80° C., whatever the $CO_2$ partial pressure, the absorption capacity of the 1-dimethylamino-3-(2-dimethylaminoethoxy)-2-propanol aqueous solution according to the invention is higher than that of the MDEA solution. At a $CO_2$ partial pressure of 1 bar, the difference between the $CO_2$ loadings of the two absorbent solutions is 0.23 mol/kg with an absorption capacity for the 1-dimethylamino-3-(2-dimethyl-aminoethoxy)-2-propanol absorbent solution increased by 28% in relation to the reference MDEA absorbent solution. At a $CO_2$ partial pressure of 3 bar, the $CO_2$ loading increase for the 1-dimethylamino-3-(2-dimethyl-aminoethoxy)-2-propanol absorbent solution is 37% in relation to the reference MDEA absorbent solution. It can thus be observed that the 47 wt. % 1-dimethylamino-3-(2-dimethyl-aminoethoxy)-2-propanol aqueous solution has a higher $CO_2$ absorption capacity than the reference 47 wt. % MDEA aqueous solution at 80° C., in the $CO_2$ partial pressure range between 1 and 3 bar corresponding to a partial pressure range representative of usual industrial conditions.

At 80° C., whatever the $CO_2$ partial pressure, the absorption capacity of the 1,1'-oxybis[3-(dimethylamino)-2-propanol] aqueous solution according to the invention is also higher than that of the MDEA solution. At a $CO_2$ partial pressure of 1 bar, the difference between the $CO_2$ loadings of the two absorbent solutions is 0.17 mol/kg with an absorption capacity for the 1,1'-oxybis[3-(dimethylamino)-2-propanol] absorbent solution increased by 20% in relation to the reference MDEA absorbent solution. At a $CO_2$ partial pressure of 3 bar, the $CO_2$ loading increase for the 1,1'-oxybis[3-(dimethylamino)-2-propanol] absorbent solution is 28% in relation to the reference MDEA absorbent solution. It can thus be observed that the 50 wt. % 1,1'-oxybis[3-(dimethylamino)-2-propanol] aqueous solution has a higher $CO_2$ absorption capacity than the reference 47 wt. % MDEA aqueous solution at 80° C., in the $CO_2$ partial pressure range between 1 and 3 bar corresponding to a partial pressure range representative of usual industrial conditions.

It therefore appears that the molecules according to the invention allow to reduce the absorbent solution flow rates required in $CO_2$-containing gas deacidizing applications in relation to the reference MDEA absorbent solution.

The invention claimed is:

1. An absorbent solution for removing acid compounds contained in a gaseous effluent, comprising:
   water;
   at least one nitrogen selected from:
   1-dimethylamino-3-(2-dimethylaminoethoxy)-2-propanol of formula as follows:

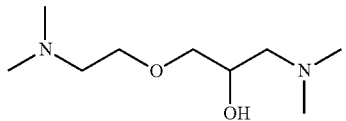

or 1,1'-oxybis[3-(dimethylamino)-2-propanol] of formula as follows:

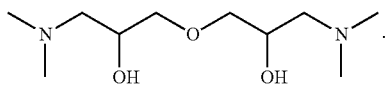

2. An absorbent solution as claimed in claim 1, comprising between 5 wt. % and 95 wt. % of said nitrogen compound, and between 5 wt. % and 95 wt. % of water.

3. An absorbent solution as claimed in claim 2, comprising between 10 wt. % and 90 wt. % of said nitrogen compound, and between 10 wt. % and 90 wt. % of water.

4. An absorbent solution as claimed in claim 1, furthermore comprising between 5 wt. % and 95 wt. % of at least one additional amine, said additional amine being either a tertiary amine or a secondary amine having two secondary carbons at nitrogen alpha position or at least one tertiary carbon at nitrogen alpha position.

5. An absorbent solution as claimed in claim 4, wherein said additional amine is a tertiary amine selected among the group made up of:
   N-methyldiethanolamine,
   triethanolamine,
   diethylmonoethanolamine,
   dimethylmonoethanolamine, and
   ethyldiethanolamine.

6. An absorbent solution as claimed in claim 1, furthermore comprising a non-zero amount less than 30 wt. % of at least one additional primary amine or secondary amine.

7. An absorbent solution as claimed in claim 6, wherein said additional primary or secondary amine is selected among the group made up of:
   monoethanolamine,
   diethanolamine,
   N-butylethanolamine,
   aminoethylethanolamine,
   diglycolamine,
   piperazine,
   1-methylpiperazine,
   2-methylpiperazine,
   homopiperazine,
   N-(2-hydroxyethyl)piperazine,
   N-(2-aminoethyl)piperazine,
   morpholine,
   3-(methylamino)propylamine,
   1,6-hexanediamine,
   N,N-dimethyl-1,6-hexanediamine,
   N,N'-dimethyl-1,6-hexanediamine,
   N-methyl-1,6-hexane-diamine, and
   N,N',N'-trimethyl-1,6-hexanediamine.

8. An absorbent solution as claimed in claim 1, furthermore comprising at least one physical solvent selected from among the group made up of methanol, ethanol, 2-ethoxyethanol, triethylene glycoldimethylether, tetraethylene glycoldimethylether, pentaethylene glycoldimethylether, hexaethylene glycol-dimethylether, heptaethylene glycoldimethylether, octaethylene glycoldimethylether, diethylene glycol butoxyacetate, glycerol triacetate, sulfolane, N-methylpyrrolidone, N-methylmorpholin-3-one, N,N-dimethylformamide, N-formyl-morpholine, N,N-dimethyl-imidazolidin-2-one, N-methylimidazole, ethylene glycol, diethylene glycol, triethylene glycol, thiodiglycol and tributyl phosphate.

9. A method of removing acid compounds contained in a gaseous effluent, wherein an acid compound absorption stage is carried out by contacting the gaseous effluent with an absorbent solution as claimed in claim 1.

10. A method as claimed in claim 9, wherein the acid compound absorption stage is carried out at a pressure ranging between 1 bar and 200 bar, and at a temperature ranging between 20° C. and 100° C.

11. A method as claimed in claim 9, wherein an acid compound-laden absorbent solution is obtained after the absorption stage, and at least one stage of regenerating said acid compound-laden absorbent solution is carried out at a pressure ranging between 1 bar and 10 bar, and at a temperature ranging between 100° C. and 180° C.

12. A method as claimed in claim 9, wherein the gaseous effluent is selected from among natural gas, syngases, combustion fumes, refinery gas, acid gas from an amine plant, Claus tail gas, biomass fermentation gas, cement plant gas and incinerator fumes.

13. A method as claimed in claim 9, implemented for selectively removing the $H_2S$ over the $CO_2$ from a gaseous effluent comprising $H_2S$ and $CO_2$.

14. A method as claimed in claim 13, wherein the gaseous effluent comprises natural gas.

* * * * *